(12) United States Patent
Clark

(10) Patent No.: US 9,323,134 B2
(45) Date of Patent: Apr. 26, 2016

(54) PORTABLE DOCUMENT CAMERA AND ASSEMBLY FOR ENABLING SAME

(76) Inventor: Shannon Elizabeth Clark, Palo Alto, CA (US)

(*) Notice: Subject to any disclaimer, the term of this patent is extended or adjusted under 35 U.S.C. 154(b) by 0 days.

(21) Appl. No.: 13/178,738

(22) Filed: Jul. 8, 2011

(65) Prior Publication Data

US 2012/0169888 A1 Jul. 5, 2012

Related U.S. Application Data

(60) Provisional application No. 61/362,571, filed on Jul. 8, 2010.

(51) Int. Cl.
*G03B 17/56* (2006.01)
*F16M 11/32* (2006.01)
*F16M 11/38* (2006.01)
*F16M 13/00* (2006.01)
*G03B 15/00* (2006.01)
*F16M 11/16* (2006.01)

(52) U.S. Cl.
CPC .......... *G03B 17/561* (2013.01); *F16M 11/16* (2013.01); *F16M 11/32* (2013.01); *F16M 11/38* (2013.01); *F16M 13/00* (2013.01); *G03B 15/00* (2013.01)

(58) Field of Classification Search
USPC ......... 348/143–160, 180–194, 207.99–207.2, 348/222.1, 240.99–240.3, 373–376, 348/207.1–207.11; 355/18–77; 359/804–807; 396/419–428
See application file for complete search history.

(56) References Cited

U.S. PATENT DOCUMENTS

| | | | | |
|---|---|---|---|---|
| 4,751,540 A * | 6/1988 | Jones | ............................ | 396/419 |
| 5,318,257 A * | 6/1994 | Tani | ............................ | 248/125.1 |
| 5,396,287 A * | 3/1995 | Cho | ............................ | 348/211.8 |
| 5,675,358 A * | 10/1997 | Bullock et al. | ................. | 345/420 |
| 5,725,187 A * | 3/1998 | Vo | ............................ | F16M 11/04 248/178.1 |
| 6,007,259 A * | 12/1999 | Mori | ....................... | F16M 11/20 248/168 |
| 6,540,415 B1 * | 4/2003 | Slatter et al. | ................... | 396/428 |
| 6,969,033 B2 * | 11/2005 | van der Linden | ...... | F16M 11/08 108/4 |
| 7,012,636 B2 * | 3/2006 | Hatanaka | .................. | 348/211.99 |
| 7,292,267 B2 * | 11/2007 | Prentice et al. | ............ | 348/207.1 |
| 8,858,097 B2 * | 10/2014 | Hale | ...................... | F16M 11/14 396/428 |
| 2002/0186317 A1 * | 12/2002 | Kayanuma | ......... | H04N 1/00204 348/373 |
| 2004/0201684 A1 * | 10/2004 | Janson, Jr. | .................. | 348/207.1 |
| 2004/0233325 A1 * | 11/2004 | Lee et al. | ....................... | 348/375 |
| 2005/0098692 A1 * | 5/2005 | Yang | ....................... | F16M 11/02 248/163.1 |
| 2006/0077286 A1 * | 4/2006 | Wenderski | ............. | F16M 11/40 348/373 |
| 2007/0103560 A1 * | 5/2007 | Suga et al. | ............... | 348/211.99 |
| 2009/0262200 A1 * | 10/2009 | Takabatake et al. | ........ | 348/207.1 |
| 2010/0182438 A1 * | 7/2010 | Mohammed | ............. | 348/207.11 |
| 2010/0214469 A1 * | 8/2010 | Duncan | .......................... | 348/373 |
| 2010/0218670 A1 * | 9/2010 | Keng | ............................ | 89/37.04 |
| 2011/0292221 A1 * | 12/2011 | Gu et al. | ..................... | 348/207.1 |
| 2012/0018597 A1 * | 1/2012 | Cyr | ........................ | F16M 11/14 248/165 |
| 2012/0033960 A1 * | 2/2012 | Hashimoto | .......... | F16M 11/046 396/428 |
| 2012/0195585 A1 * | 8/2012 | Wagner | ................ | F16M 11/041 396/428 |
| 2013/0233986 A1 * | 9/2013 | Rasheta | ............... | G03B 17/561 248/205.1 |

* cited by examiner

*Primary Examiner* — Michael Osinski
(74) *Attorney, Agent, or Firm* — Mahamedi Paradice LLP

(57) ABSTRACT

A small, lightweight assembly that enables document camera functionality, along with other features and functionalities is disclosed. Examples of additional functionality provided with some embodiments include split-screen viewing, high quality screen shots, and digital zoom.

15 Claims, 6 Drawing Sheets

PORTABLE DOCUMENT CAMERA AND ASSEMBLY FOR ENABLING SAME

RELATED APPLICATIONS

This application claims benefit of priority to Provisional U.S. Application No. 61/362,571, filed Jul. 8, 2010; the aforementioned priority application being incorporated by reference in its entirety.

TECHNICAL FIELD

The disclosed embodiments relate to a portable document camera.

BACKGROUND

Conventional document cameras are typically used in settings such as schools, universities, courtrooms and churches. Document cameras are typically bulky, ranging from 12 lbs to 40 lbs. Bulkiness and immobility are especially problematic in schools, because the cameras can obstruct the students' view of the whiteboard and disrupt note taking. These document cameras must remain in their classrooms, which poses a risk. Since classrooms tend to be easily accessible, expensive equipment is a vulnerable target for theft. In addition, transparency projectors are loud, power consuming and large. Cameras have become cheap enough and accurate enough to eliminate the need for transparencies.

Currently, popular high-quality document cameras include the Samsung Elmo HV-110U ($692.10), the Samsung UF-80ST ($2,070.00) and the SMART Document Camera ($999.00). These cameras have an extensive list of features that are superfluous in a classroom setting. While expensive document cameras have microphone inputs, light boxes, and numerous input/output connections, these features make the products overly complicated for users who simply want to display documents, books and artifacts.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein provide a portable document camera and assembly for enabling same. In particular, embodiments described herein include a small, lightweight assembly that enables document camera functionality, along with other features and functionalities. Examples of additional functionalities provided with some embodiments include split-screen viewing, high quality screen shots, and digital zoom.

According to embodiments, the portable document camera is adjustable in height to enable its placement over documents, 3-D specimens (artifacts, leaves, rocks, models, etc.), books, dissections, etc.

According to at least some embodiments, an assembly includes a portable stand, a camera, and a programmed computer (or software for computer that can be attached to a camera). As will be described, the computer may correspond to, for example, a conventional laptop or portable computer on which software is executed to enable functionality such as described. Still further, some embodiments provide that the camera is integrated or coupled with lighting sources, such as a set of Light Emitting Diodes (LEDs). The light sources may illuminate a surface of the portable stand on which a document or artifact is provided.

Stand

Embodiments described herein provide for an assembly to include a stand that is adjustable in various dimensions (e.g., height, rotation) and configurations to enable efficient operability and portability. In particular, one or more embodiments provide that the stand retains a camera in a downward orientation, while being adjustable to enable the document camera to be positioned over a document or artifact. In other embodiments, the camera may be oriented in other directions (such as in an upward orientation or on a side).

Figure 2:
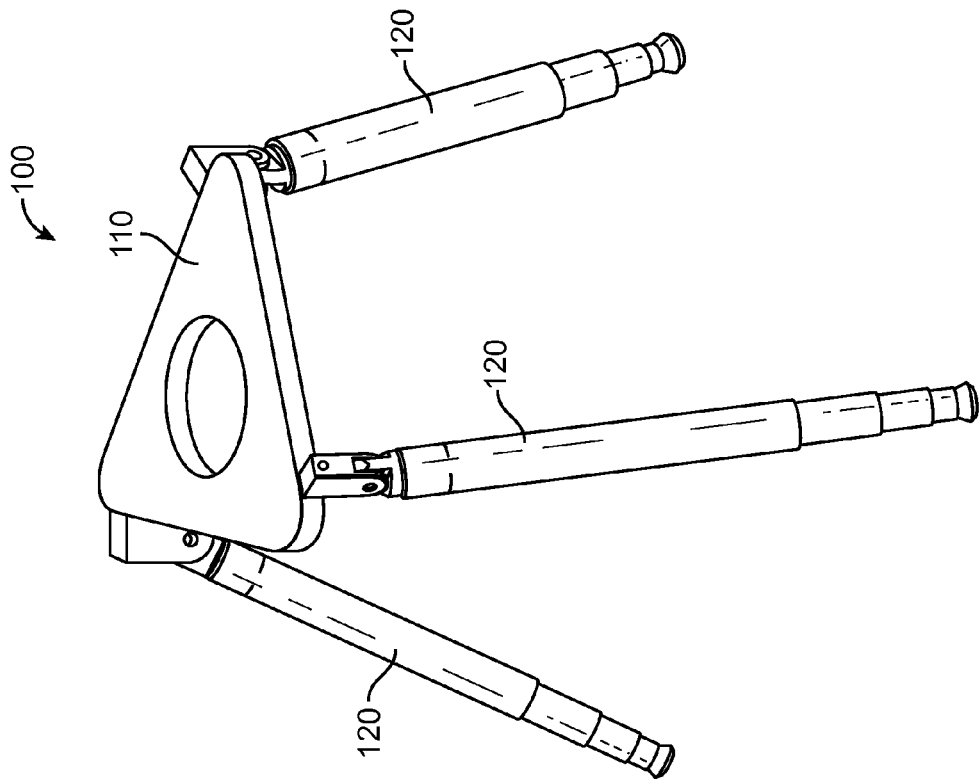
FIG. 2 illustrates a stand for a camera in another configuration, under an embodiment.
Figure 1:
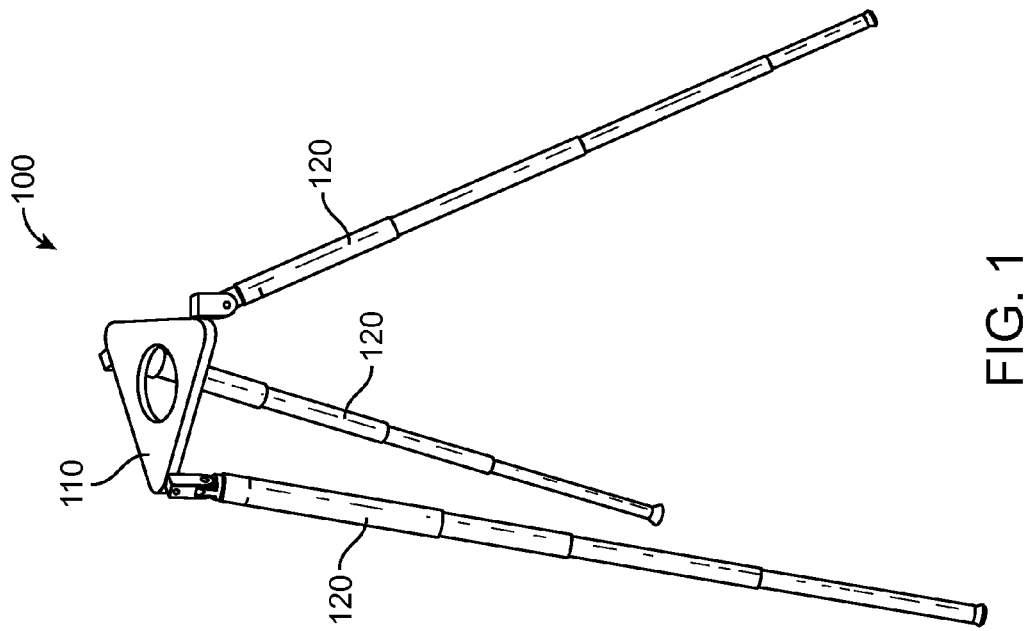
FIG. 1 illustrates a stand for a camera according to an embodiment.

With reference to FIG. 1, a stand 100 is shown for retaining a camera in a document camera setting, under an embodiment. The stand 100 is shown in an extended position. More specifically, the stand 100 includes a platform 110 that is supported by adjustable legs 120. The legs 120 can extend to increase the overall height of the stand 100 (FIG. 1) and retract to decrease the overall height of the stand 100 (FIG. 2). In a retracted or partially retracted position such as shown, the stand 100 can be placed over a document or artifact. In other embodiments, the legs 120 are each individually adjustable so that one particular leg 120 can be longer than the other legs 120 to enable greater flexibility. For example, if the surface in which the stand 100 is placed is uneven, having individually adjustable legs 120 may be useful to keep the platform 110 in a substantially flat or horizontal configuration. In another embodiment, the legs 120 may be adjustable together (for example, to provide uniformity).

Figure 3:
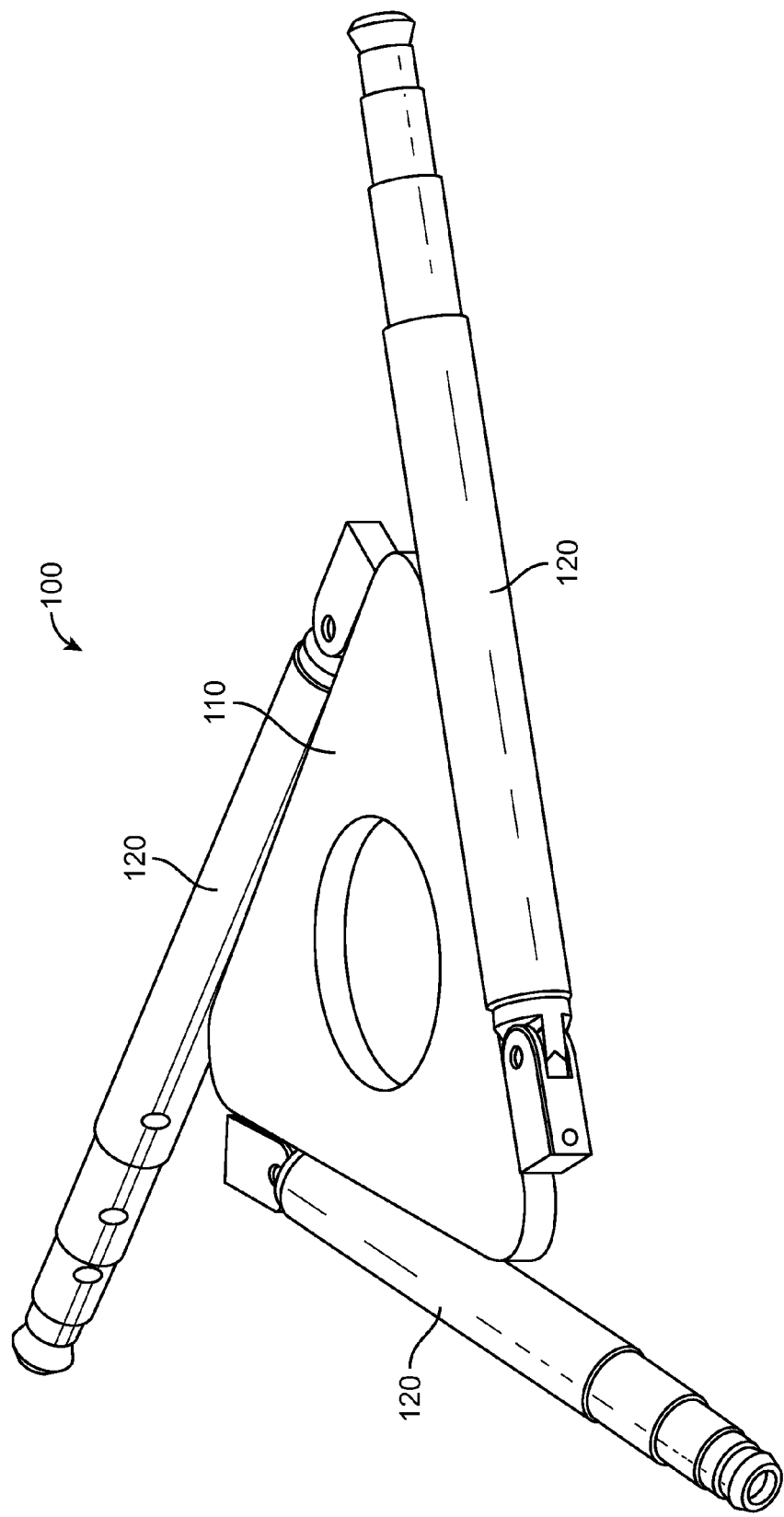
FIG. 3 illustrates a stand for a camera in a collapsed position, according to an embodiment.

FIG. 3 illustrates the stand 100 in a collapsed and minimized position. In one embodiment, the legs 120 collapse (e.g., retract to a minimal or substantially minimal length) and pivot (e.g., 90 degrees) to enable the collapsed configuration.

The legs 120 can retract (e.g., inward like a handheld telescope) to minimize the overall dimension of the stand. In some embodiments, the legs 120 can rotate about a pivot (at the point where the leg 120 is coupled to the platform 110) up to a full 360 degrees (or less). Because the stand 100 can collapse into a minimized position, it is portable and can be easily stored.

Figures 4, 5:
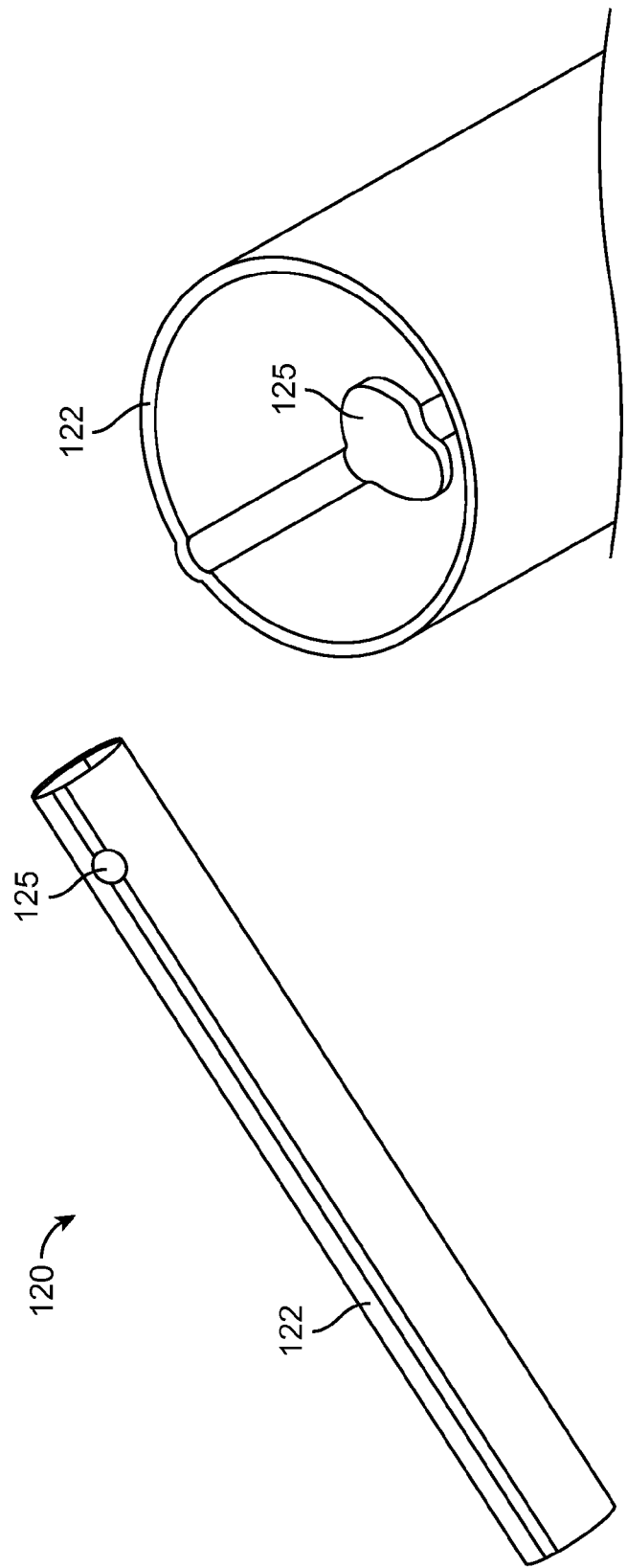
FIG. 4 illustrates a segment for a leg of a stand, in one embodiment.
FIG. 5 illustrates a different view of the segment described in FIG. 4, under an embodiment.

FIG. 4 through FIG. 9 illustrate components of one of the legs 120 of the stand, under an embodiment. More specifically, FIG. 4 through FIG. 9 illustrate a spring mechanism for enabling a telescoping leg 120 of the stand 100 to be locked in an extended position. In FIG. 4, an outer segment 122 is provided to concentrically house another segment (see segment 126 in FIG. 8 and FIG. 9). Each leg 120 may be formed by a number of different segments. In one embodiment, the segment 122 includes an aperture 125 for receiving a spring lock in connection with the interior segment 126 moving into the locked (or extended position). As discussed below, the spring lock may enable the leg 120 to maintain a certain length when the spring lock is engaged with the aperture 125. According to various embodiments, the outer segment 122 and other components of the stand 100 may be formed of metal, plastic, and/or other physically strong material.

FIG. 5 illustrates an internal view of the segment 122 with the aperture 125. In some embodiments, the segment 122 may include a groove along one or more sides of the segment 122. The grooves may assist in aligning the different segments of the leg 120. One or more other segments of the leg 120 may include similar apertures 125 and/or the grooves described.

Figure 7:
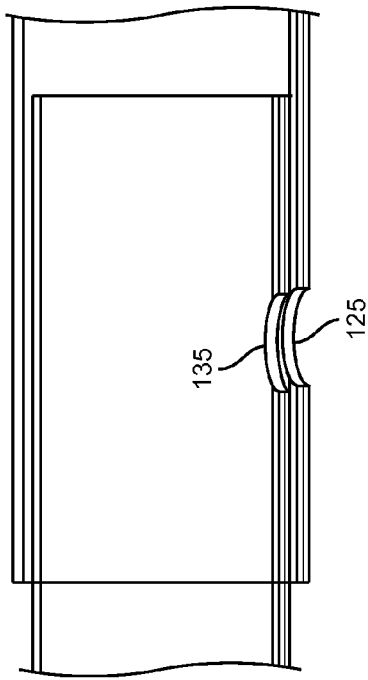
FIG. 7 illustrates a cross sectional view of an interior segment and an exterior segment with the apertures aligned, in one embodiment.
Figure 6:
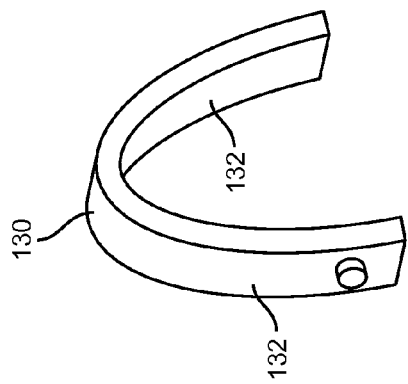
FIG. 6 illustrates a biasing mechanism for locking segments of a leg of a stand together, according to an embodiment.

FIG. 6 illustrates a biasing mechanism under one implementation. The biasing mechanism 130 is U-shaped and inserted by its close end within the interior segment 126. The interior segment 126 is inserted into the exterior segment 122 so that the leg 120 may extend or retract, as discussed above (see FIG. 8 and FIG. 9 showing the interior segment 126 being encircled by exterior segment 122). The bends 132 of the biasing mechanism 130 are pushed inward and bias outward when contained within the interior segment 126. Each of the interior and exterior segments 126, 122 include apertures 135, 125, respectively (see FIG. 7 illustrating aperture 135 of the interior segment 126 and aperture 125 of the exterior segment 122). When the segments 122, 126 are positioned so that the apertures 125, 135 align, a protrusion 133 that is coupled to (or extends from) the bends 132 protrudes through the aligned apertures 125, 135. This enables the two segments 122, 126 to lock together.

Figure 9:
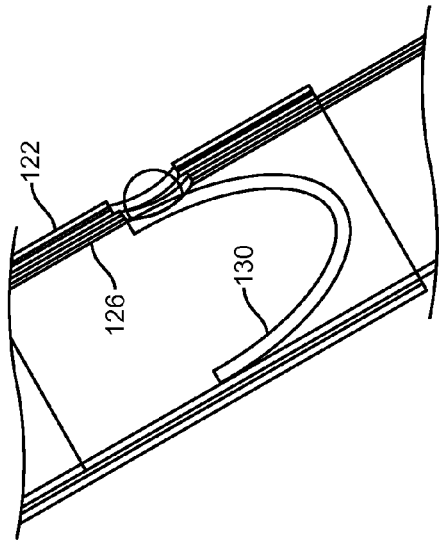
FIG. 9 illustrates a cross sectional view of a biasing mechanism that locks two segments of a leg of a stand, according to an embodiment.
Figure 8:
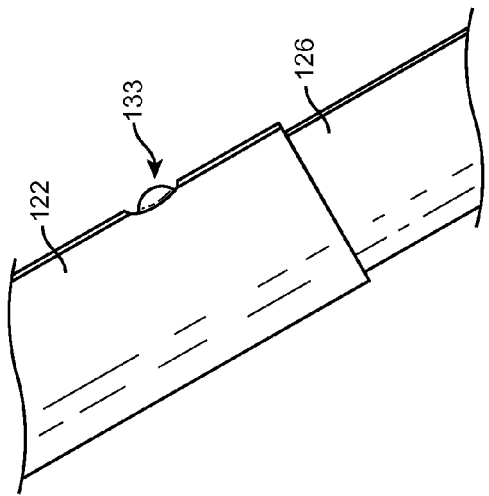
FIG. 8 illustrates a leg of a stand where the segments are locked by a biasing mechanism, under an embodiment.

FIG. 8 and FIG. 9 illustrate the biasing mechanism 130 that is engaged with the segments 122, 126 in a locking position. As discussed above, when the apertures 125, 135 of the segments 122, 126 are aligned (see FIG. 7) the protrusion 133 extends out of the apertures 125, 135 to lock the segments 122, 126 in place. This enables the legs 120 of the stand 100 to be fixed (e.g., so that it is not wobbly when it is being used with a camera). The segments 122, 126 may be unlocked from this position when a user presses the protrusion 133 inward, so that the segments may slide about each other (so that the apertures 125, 135 will no longer be aligned). In other embodiments, as discussed above, the segments 122, 126 (and other segments) may include a groove (see FIG. 4 and FIG. 5) to help align the segments and enable the protrusion 133 to slide along the interior side of the groove.

In some embodiments, the same biasing mechanism can be used for locking other segments of the legs 120 of the stand 100. For example, a third segment may be interior to the interior segment 126 so that the interior segment 126 has a second aperture to align with the aperture of the third segment. Another biasing mechanism may be included in the third segment to operate in a similar fashion as illustrated in FIG. 8 and FIG. 9.

Figure 11:
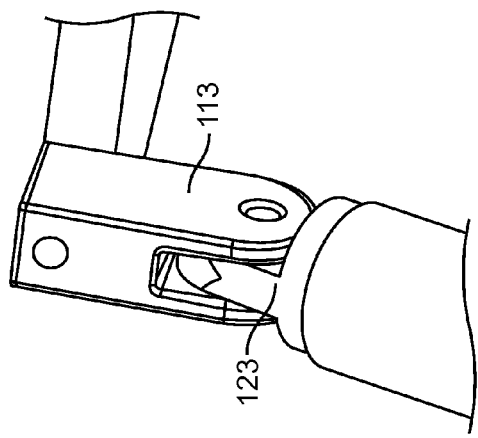
FIG. 11 illustrates a different view of the pivot connection illustrated in FIG. 10.
Figure 12:
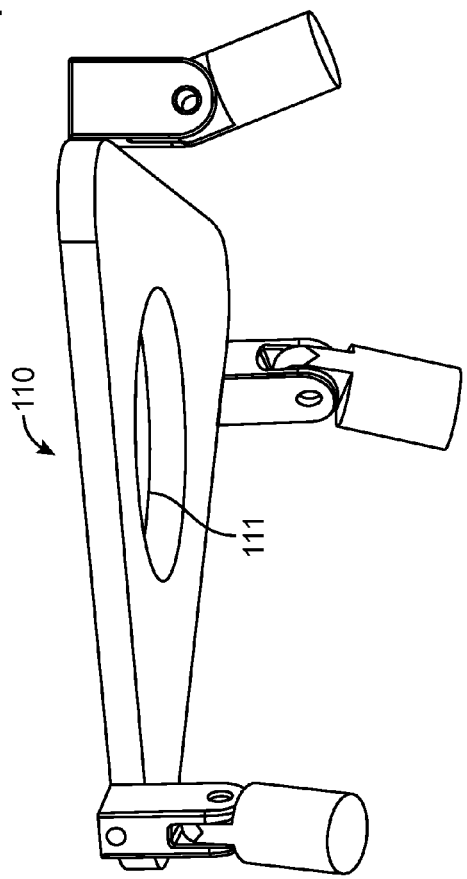
FIG. 12 illustrates three pivot connections for three legs of a stand, under an embodiment.
Figure 10:
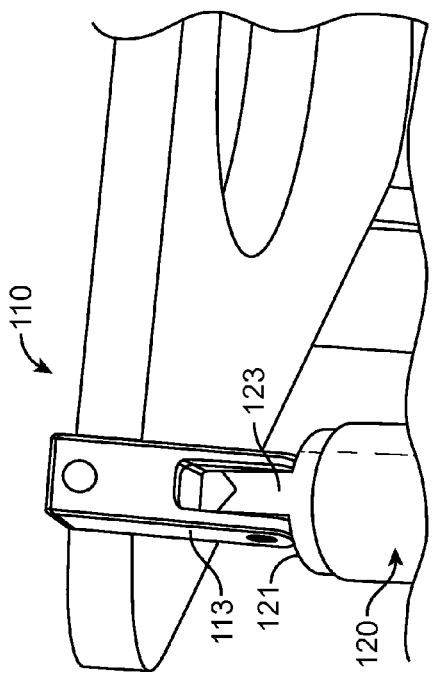
FIG. 10 illustrates a pivot connection between the legs and the platform of the stand, in one embodiment.

FIG. 10 through FIG. 12 illustrate a hinge or pivot connection between the telescoping legs 120 and the platform 110. One end 121 of each leg 120 may include a pivot connection 123 that mates with a corresponding pivot connection 113 of the platform 110. The pivot connections 113, 123 enable the legs 120 to pivot from a downward or vertical direction into a variety of folded or partially folded orientations. In some embodiments, the pivot connection 113 of the platform 110 may also pivot or rotate so as to enable the stand 100 to be in a collapsed or minimized orientation (see FIG. 3). The legs 120 may be pivoted (by pivot connection) into an orientation that is substantially co-planar with the platform 110. The legs 120 may also be contracted when pivoted, to minimize the overall dimension of the assembly 100.

In other embodiments, the telescoping legs 120 may connect to the platform 110 by using a ball and socket connection. The ball and socket connection includes a rounded portion ("ball") on the top of each leg 120 and a receiving portion for at least partially encapsulating the ball. Each ball is fitted into the receiving portion at each connection point on the platform 110. The ball and socket connection enables the telescoping legs 120 to rotate, turn, bend, etc. in various positions or configurations in order to enable a user to more accurately and efficiently position the stand 100 over an item (e.g., a document or an artifact). It may allow for more degrees of freedom and greater flexibility for positioning the camera 200 on the platform 100. The ball and socket connection may also allow for various arrangements when the telescoping legs 120 are configured to be in a contracted and/or storage position. The number of ball and socket connections may correspond to the number of telescoping legs 120 that are provided as part of the stand 100.

The pivot connections 113, 123 enable the legs 120 to move or pivot about the pivot point in a variety of different directions. In some embodiments, the pivot connections 113, 123 can be particularly designed so that the leg 120 that is connected to the pivot connections 113, 123 can only move in a certain direction or can only move to a certain limit (in either direction, for example). The number of hinges or pivot connections may vary depending on the particular shape or design of the platform 110 (e.g., if the platform 110 is a pentagon shape, there may be five hinges or pivot connections for coupling five legs 120 to the platform 110).

Figure 13:
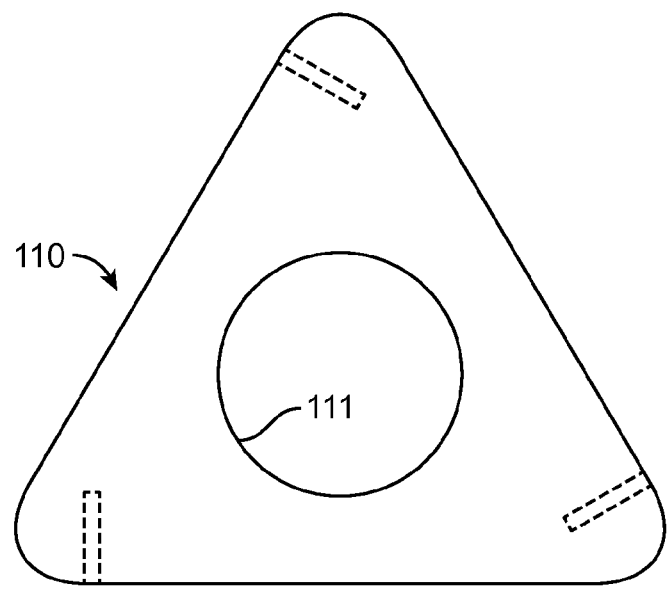
FIG. 13 illustrates a platform of a stand, according to one embodiment.

FIG. 13 illustrates the platform 110 of the stand 100, under an embodiment. The platform 110 may include a triangular shape that is supported by an arrangement of three telescoping, pivoting legs. Alternative geometries (e.g., square, rectangular, circular, pentagonal) are possible with alternative number of legs. For example, the stand 100 may include a rectangular shape platform and four legs 120. The platform 110 is structured to position a camera in optical view of a document or artifact. In particular, the platform 110 includes an opening 111 (see also FIG. 12) that is dimensioned to hold a camera 200 (see FIG. 14). The camera 200 is positioned downward into the opening 111 so that it faces toward the legs 120. The platform 110 may then be positioned over a document or three-dimensional artifact to enable its image capture by the camera 200. A user may retract or shorten the legs 120, for example, to move the camera 200 closer to an object, such as a document, and may lengthen or expand the legs 120 to move the camera 200 further away from an object, such as a taller three-dimensional artifact.

According to embodiments, the stand 100 is formed from lightweight material, such as aluminum, in order to facilitate its portability. Other structural features that can be included with the stand 100 include: (i) rubber feet or suction cups at the base of legs 120 for traction on table, and/or (ii) one or more clamps (e.g., plastic or metal) or retaining mechanism that hold each telescoping leg in place during storage. One or more legs 120 may also include a weighted base coupled to the bottom of a leg 120 so that the stand 100 may be steadier on a given surface. The weighted base(s) may enable the stand 100 to have better balance if the legs 120 are not in a perfect symmetric configuration or arrangement. The weighted base may also be coupled to a leg 120 by using a pivot, hinge or ball and socket combination, such as a similar mechanism for coupling a leg 120 to the platform 110. In some embodiments, the weighted base(s) may be detachable from the legs 120.

As discussed with FIGS. 1-3, the platform 110 may be designed to have various shapes and/or sizes. In some embodiments, the opening 111 of the platform 110 may be adjustable to hold different size cameras. The platform 110 may also include a variety of different coupling mechanisms for holding the camera 200 in place so that the camera 200 will be stable and balanced when it is taking an image or video of a document, object, or artifact. The sides of the platform 110 may also include one or more clamps or retaining mechanisms (as discussed above) so that it may hold a telescoping leg 120 in place when the stand 100 is in a contracted and/or storage position (see FIG. 3).

In some embodiments, the telescoping legs 120 of the stand 100 may include one or more pivots or hinges (or ball and socket combination) along the length of the legs 120 to enable various segments (e.g., 122, 126) to bend or pivot about each other. This enables the stand 100 to have greater flexibility so that the telescoping legs 120 may extend or contract, and bend or pivot at various positions to allow for the best orientation or position over a document or artifact. For example, a leg 120 may have two pivots (or ball and socket combinations) so that the leg 120 can bend in multiple directions at multiple pivots. In one embodiment, a pivot or hinge may be positioned in a region close to where the segments of a leg 120 meet (e.g., near the biasing mechanism). In another embodiment, the pivot or hinge or ball and socket combination may be positioned in a region near the middle of a segment of a leg 120.

As discussed, the stand 100 may include one or more legs 120 with a weighted base(s). In some embodiments, the stand 100 may include one leg 120 with a weighted base that is coupled to the bottom of the leg 120 using a pivot, hinge or ball and socket combination. The weighted base is heavy enough to support the stand 100 (e.g., the leg 120 in a certain position (e.g., angled about the base), the platform 110 and the camera 200). This enables the camera 200 to be arced over a document or artifact while using just one leg 120 as support. According to another embodiment, the leg 120 in a one-legged stand 100 may be fully posable by having a plurality of different pivots, hinges, joints, etc. along the leg 120.

In one embodiment, the stand 100 may include two legs 120 with a weighted base on each leg 120. Because of the weighted base, the stand 100 may not necessarily have to be symmetric. For example, referring to FIG. 3 for illustrative purposes, the stand 100 may include two legs 120 (with two legs in the same position and one leg missing from FIG. 3). However, even though the two legs 120 are not positioned symmetric about the stand 100, the weighted bases on each leg 120 may be heavy enough to support the stand 100 so that the platform 100 and camera 200 can arc over a document or object for viewing.

According to another embodiment, the stand 100 may include a number of different clips or coupling mechanisms for retaining various wires, cords, etc. that may be coupled to the camera 200.

Camera

Figure 14:
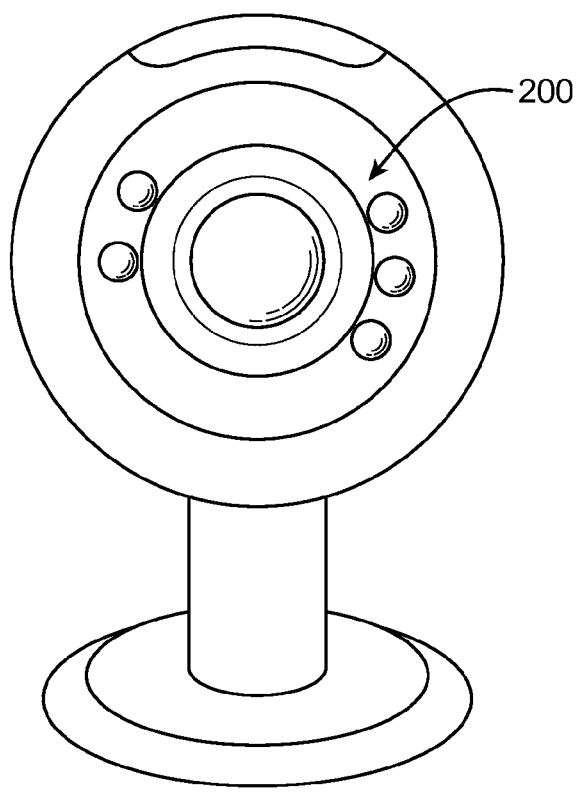
FIG. 14 illustrates a camera for use with a stand, in an embodiment.

FIG. 14 illustrates a camera 200 for use with one or more embodiments. In particular, camera 200 may be configured as a webcam that is connectable to a standard personal computer, such as a net-book, a laptop, or other portable computing devices. In some implementations, the camera 200 is connectable to a computer using a standard USB connection. The camera 200 may also be connected to a portable computing device using other communication ports. Alternative implementations include using wireless or radio-frequency connections to enable the camera 200 to connect and communicate with a computing device. The camera 200 may be integrated or connected to LED lights in order to illuminate the scene with the document/artifact that is being imaged. Additionally, the camera 200 can be powered by the computer, and can be programmatically (e.g., automatically using software programming) or manually focused (through computer, or with interaction with camera).

In one embodiment, the camera 200 corresponds to a USB 6 LED PC web camera by "Hottest Deals Ever" Corporation, having features such as manual focus, adjustable LED lighting and a USB connection cable. In other embodiments, the camera 200 is built into the platform as part of the product. In such embodiments, the platform 110 may not have an opening 111, but may be incorporate the camera 200 as part of the platform 110.

The camera 200 may be a digital camera that is capable of taking digital photos and/or videos (including audio) and storing it in a storage (in a removable memory, a stored memory or a remote memory, etc.). As discussed, the camera 200 may have wireless communication capabilities (e.g., BT, infrared, Wi-Fi) for communicating with another computing device (such as a laptop, cellular phone, computer, tablet device, etc.). The camera 200 may also wirelessly (or using a wire-line) communicate with a separate remote control device to enable a user to use the remote control device to control the camera 200 (e.g., zoom, take a photo, start or stop a video recording, or use other camera options/settings).

Software Functionality

A computing device that accompanies the assembly may be programmed to operate and enhance the functionality of the camera 200. For example, a user may install on his or her computer, laptop, tablet device, a software program or application for controlling and operating the camera 200. In particular, one or more processors of a computer (e.g., laptop or other computing device) may execute instructions for: (i) detecting the camera, and responding by enabling document camera functionality; (ii) capturing and displaying images in one or more displays that are provided or connected with the computer; (iii) orienting the image for presentation on a particular display (e.g., for projection screen or on laptop screen); (iv) enabling digital zooming; (v) capturing of views; (vi) auto-saving images of documents/artifact; (vii) automatically associating metadata such as time of image capture with saved camera; and/or (viii) enabling easy side-by-side viewing of another software presentation (e.g., Powerpoint) and the image displayed by the camera.

Embodiments described herein extend to individual elements and concepts described herein, independently of other concepts, ideas or systems, as well as combinations of elements recited anywhere in this application. Although illustrative embodiments have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

What is claimed is:

1. A document camera assembly comprising:
an adjustable stand to retain a user selected camera over an underlying surface, the adjustable stand comprising multiple legs and a platform, the platform being structured to retain a user selected camera in a downward and operative position;
wherein each of the multiple legs (i) extends from the platform, and (ii) is telescopically adjustable in length by concentric action to position the platform in at least two platform positions, including a retracted position and an expanded position;
wherein the platform is structured to maintain the user selected camera in the downward and operative position while the platform is adjusted to and between the at least two platform positions;
wherein in the expanded position of use, the platform is elevated over the underlying surface to support the selected camera in the downward and operative position to capture images of either the underlying surface, or of a document or artifact positioned thereon; and
wherein in the retracted position, (i) each of the multiple legs is extended from and adjacent to the platform, (ii) the platform is flat against the underlying surface, with the platform supporting the selected camera in the downward and operative position.

2. The assembly of claim 1, wherein the selected camera is a webcam.

3. The assembly of claim 1, wherein the selected camera is integrated or coupled to one or more light sources.

4. The assembly of claim 1, wherein the stand includes an opening to receive and retain any one of multiple cameras of different sizes.

5. The assembly of claim 1, further comprising:
one or more processors that are coupled to at least the user selected camera in order to operate the user selected camera in providing any one of a plurality of document camera functionalities.

6. The assembly of claim 5, further comprising:
one or more processors that are coupled to at least the selected camera to operate the selected camera in providing any one of a plurality of document camera functionalities; and
wherein the one or more processors provide one or more document camera functions that include one or more of the following: (i) digital zooming; (ii) multiple views; (iii) autosaving images of documents/artifact; or (iv) side-by-side viewing of another presentation.

7. The assembly of claim 5, further comprising:
one or more processors that are coupled to at least the selected camera to operate the selected camera in providing any one of a plurality of document camera functionalities; and
wherein the one or more processors perform the document camera functionalities by detecting a camera image and displaying and manipulating the image through software.

8. The assembly of claim 5, further comprising:
one or more processors that are coupled to at least the selected camera to operate the selected camera in providing any one of a plurality of document camera functionalities; and
wherein the one or more processors provide the document camera functionalities by capturing and displaying images from the camera.

9. The assembly of claim 5, further comprising:
one or more processors that are coupled to at least the selected camera to operate the selected camera in providing any one of a plurality of document camera functionalities; and
wherein the one or more processors provide the document camera functionalities by orienting an image captured by the camera for presentation on a particular display.

10. The assembly of claim 5, further comprising:
one or more processors that are coupled to at least the selected camera to operate the selected camera in providing any one of a plurality of document camera functionalities; and
wherein the one or more processors provide the document camera functionalities by digital zooming.

11. The assembly of claim 5, further comprising:
one or more processors that are coupled to at least the selected camera to operate the selected camera in providing any one of a plurality of document camera functionalities; and
wherein the one or more processors provide the document camera functionalities by providing multiple views of an image captured by the camera.

12. The assembly of claim 5, further comprising:
one or more processors that are coupled to at least the selected camera to operate the selected camera in providing any one of a plurality of document camera functionalities; and
wherein the one or more processors provide the document camera functionalities by auto-saving images of documents or artifact.

13. The assembly of claim 5, further comprising:
one or more processors that are coupled to at least the selected camera to operate the selected camera in providing any one of a plurality of document camera functionalities; and
wherein the one or more processors provide the document camera functionalities by associating metadata such as time of image capture with an image captured by the camera.

14. The assembly of claim 5, further comprising:
one or more processors that are coupled to at least the selected camera to operate the selected camera in providing any one of a plurality of document camera functionalities; and
wherein the one or more processors provide the document camera functionalities by enabling side-by-side viewing of images.

15. The assembly of claim 1, wherein the platform includes an opening to retain the user selected camera in the downward and operative position as the platform is moved between the expanded position and the retracted position.

* * * * *